United States Patent [19]

Duyvesteyn et al.

[11] Patent Number: 4,610,721
[45] Date of Patent: Sep. 9, 1986

[54] TWO-STAGE LEACHING PROCESS FOR STEEL PLANT DUSTS

[75] Inventors: Willem P. C. Duyvesteyn, Benthuisen, Netherlands; Mahesh C. Jha, Arvada, Colo.

[73] Assignee: AMAX Inc., Greenwich, Conn.

[21] Appl. No.: 696,980

[22] Filed: Jan. 31, 1985

[51] Int. Cl.$^4$ ................................................. C22B 3/00
[52] U.S. Cl. ................................. 75/97 A; 75/101 R; 75/115; 75/120; 75/121; 423/52; 423/106; 423/109; 423/128; 423/131; 423/146; 423/150; 423/166; 423/325; 204/114
[58] Field of Search ................. 423/98, 52, 103, 109, 423/106, 325, 108, 128, 131, 146, 150, 166; 75/111, 97 A, 115, 101 R, 120, 121; 204/114

[56] References Cited

U.S. PATENT DOCUMENTS 4,332,777  6/1982  Pazdej ............................. 423/109
4,440,569  4/1984  Weir et al. ....................... 423/109

Primary Examiner—John Doll
Assistant Examiner—Robert L. Stoll
Attorney, Agent, or Firm—Michael A. Ciomek; Eugene J. Kalil

[57] ABSTRACT

A process is provided for selectively recovering zinc from steel plant dust containing substantial amounts of iron. The process comprises atmospherically leaching the steel plant dust in a first stage wherein an amount of steel plant dust is mixed with an amount of acidic zinc sulfate solution to leach zinc therefrom, the leaching of the dust being such that the solution is controlled to a terminal pH ranging from about 2 to 3.5 and preferably from about 2.5 to 3.5, thereby limiting iron dissolution. The mixture is then subjected to a crude liquid/solid separation step whereby a thickened pulp is produced containing zinc and iron values and a separated liquid containing low iron and substantial amounts of zinc, the solution being sent to zinc recovery. Following separation, the thickened pulp, together with additional sulfuric acid or spent electrolyte, is subjected to high pressure leaching at a temperature at least sufficient to leach the remaining zinc values and provide an acid zinc sulfate solution thereof, while converting hydrated iron oxides into free settling hematite residue, the amount of additional sulfuric acid added to said thickened pulp being sufficient to obtain near quantitative dissolution of zinc without excessive iron dissolution.

10 Claims, 1 Drawing Figure

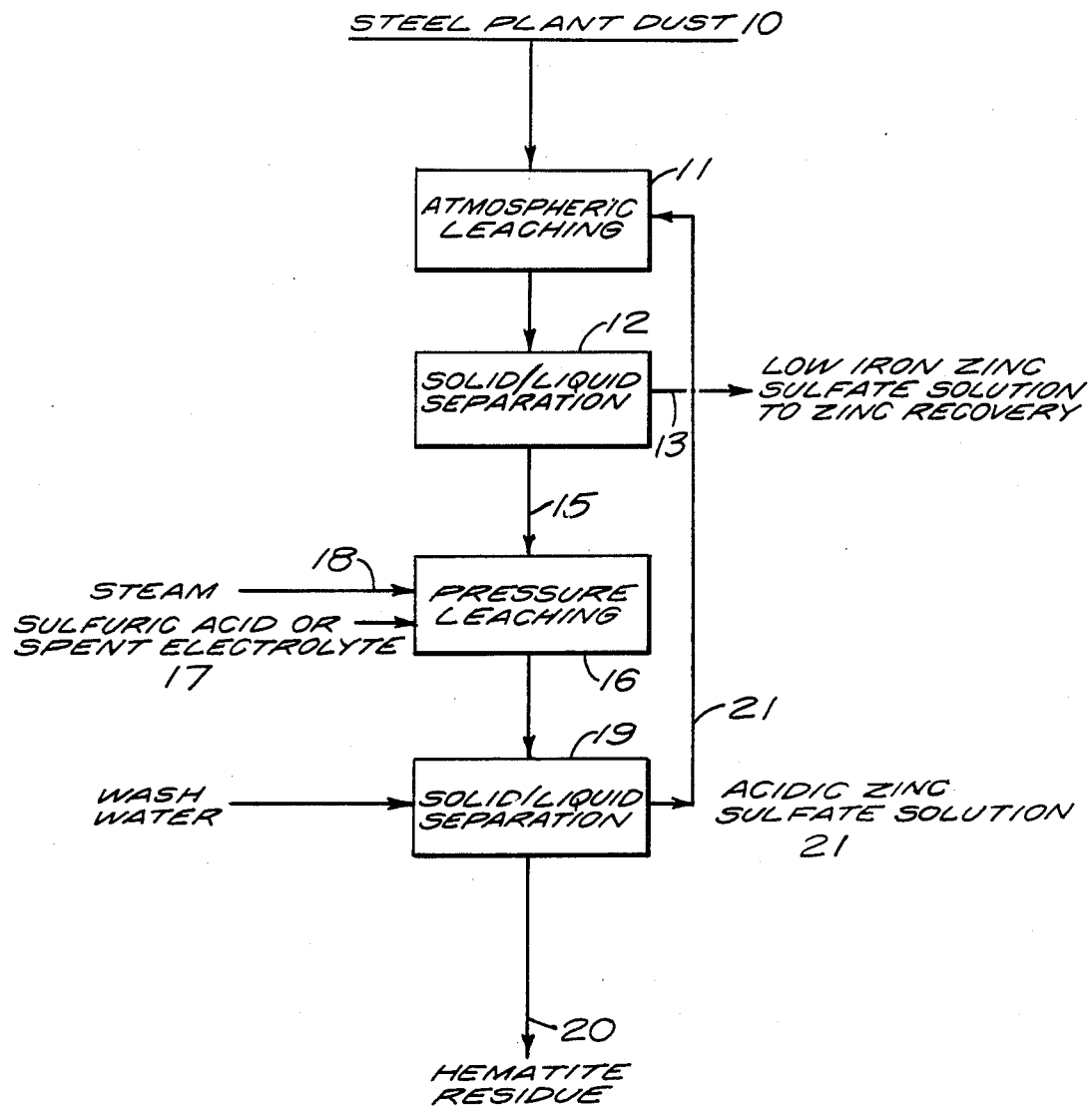

TWO-STAGE LEACHING PROCESS FOR STEEL PLANT DUSTS

This invention relates to a two-stage leaching process that recovers zinc quantitatively from the steel plant dusts, while substantially completely rejecting iron in the form of an easy settling hematite residue.

BACKGROUND OF THE INVENTION

During melting and refining of steel, the gas leaving the furnace carries a substantial amount of fine dust particles. To protect the atmosphere, these particles are removed in cyclones, scrubbers and other similar devices. The dust particles are made up of two types of materials. Firstly, it consists of fine particles charged to the furnace such as those of iron oxides, calcium oxide and silica, which are mechanically carried away by the gas. Secondly, it consists of oxide particles of nonferrous metals such as zinc and lead, which evaporate at the high temperatures of the steel bath and later condense and oxidize in the flue. The amounts of these nonferrous metal oxides in the dust increase as the dust is repeatedly recycled or as more scrap containing these metals are charged into the furnace.

The dust can be repeatedly recycled only for a limited number of cycles. With each recycle, the amount of dust to be collected increases due to larger proportion of the very fine dust particles in the feed. The feeding of such fine particles of low bulk density becomes increasingly difficult. Furthermore, as the amount of recycled dust increases, the energy requirement for reducing and melting iron and other metals from the dust increases.

Also, with repeated recycling, the nonferrous metal content of the dust increases to the point where their return to the steel bath adversely affects the steel melting operation. As oxides present in the slag, they attack the refractory lining of the furnace. In reduced form, these metals enter the molten steel at concentrations higher than permissible to meet specifications for proper mechanical and physical properties of the steel. At this point, the dust has to be removed from the system. Traditionally, this dust has been considered a waste material and disposed of in landfills.

This disposal method is becoming more expensive, not only because of increasing land and transportation costs but also because of increasingly stringent environmental protection regulations. Since the dust particles are very fine, they are likely to become airborne unless they are agglomerated to some extent or kept covered. Furthermore, the chemical nature of these dust particles is such that they classify as hazardous waste, based on the EP toxicity test prescribed by the U.S. Environmental Protection Agency. As disclosed in the article entitled "Characterization of Steelmaking Dusts from Electric Arc Furnace", *United States Bureau of Mine's Report of Investigation No.* 8750 (1983) by S. L. Law et al., the toxicity is related to the presence of lead, cadmium and sometimes chromium, which article is incorporated herein by reference.

In view of the above, there has been an increasing interest in developing processes that will permit removal and recovery of nonferrous metals such as zinc, lead and cadmium from the steel plant dusts. The dust, depleted of these metals, can be recycled back to the steel furnace for recovery of iron or can be stored as a nontoxic waste. Since the tonnage of this material is substantial (about 500,000 tons was produced in 1979 from U.S. electric furnace operations only, according to the aforementioned article), it represents an important source of zinc, lead and iron metals.

STATE-OF-THE-ART AND SHORTCOMINGS OF THE EXISTING PROCESSES

Because of increasing awareness for environmental concerns in the 1960's, several attempts were made to develop processes for recovery of zinc and lead from the steel plant dusts. At that time, pyrometallurgical processes were generally employed in primary zinc and lead industries, and therefore, it is not surprising that similar processes were proposed to treat the steel plant dust. Basically, the processes were variations of the commercial Waelz Process. In essence, the dust is partly reduced at high temperatures to volatilize zinc and lead metals, which are then oxidized and condensed as mixed oxides. A variety of equipment has been suggested to perform the actual operations of reduction, oxidation and condensation, as detailed in numerous U.S. patents listed below.

| U.S. Pat. No. | Date | Inventor(s) |
| --- | --- | --- |
| 3,262,771 | 7/1966 | Ban |
| 3,403,018 | 9/1968 | Thom |
| 3,754,890 | 8/1973 | Fitch |
| 3,756,804 | 9/1973 | Stevenson |
| 3,770,416 | 11/1973 | Goksel |
| 3,850,613 | 11/1974 | Allen |
| 4,396,423 | 8/1983 | Stephens, et al. |
| 4,396,424 | 8/1983 | Yatsunami, et al. |

None of these processes have been implemented on commercial scale. This is chiefly because of high capital and operating costs involved with high temperature ($\sim 1,200°$ C.) operations that not only need expensive energy but also require elaborate gas handling and cleaning systems to reduce the atmospheric pollution. The presence of chloride and fluoride salts in the dust causes severe corrosion problems and necessitates use of expensive alloys as materials of construction. Another major shortcoming of the pyrometallurgical processes is that both lead and zinc are collected together in one intermediate product that needs considerable further processing to separate the two metals.

As an alternative, hydrometallurgical processes have been investigated, particularly after the escalating energy costs experienced in the early 1970's. It is also worth noting that about 90 percent of the primary zinc is now produced by a hydrometallurgical process.

One hydrometallurgical method, disclosed in U.S. Pat. No. 3,849,121 granted to Burrows, recommends use of ammonium chloride as a lixiviant. Another process, disclosed in U.S. Pat. No. 4,071,357 granted to Peters, recommends use of ammonia and carbon dioxide gases. Use of strong caustic as a lixiviant is suggested in European Pat. No. 0040659 granted to Pooley et al. These alkaline leaching processes suffer from three common shortcomings: (1) the solutions generated are not compatible with existing zinc plant operations which all treat zinc sulfate solutions; (2) lead is also dissolved in these processes along with the zinc; and (3) the reagents are expensive.

Acid leaching of the steel plant dust would overcome some of these shortcomings. An article by D. Pearson entitled "Recovery of Zinc From Metallurgical Dusts and Fumes", Chapter 14, of the publication *Process and Fundamental Considerations of Selected Hydrometallur-* gical Systems, M. C. Kuhn, Editor, Society of Mining Engineers of AIME (1981, pp. 153-168), describes the work performed at Warren Springs Laboratory in which sulfuric acid was used to dissolve the zinc from electric arc furnace dusts. While zinc recovery of about 80 percent was obtained, iron dissolution was extensive, about 20 to 22 g/L, indicating high acid consumptions. An even more serious problem was the separation of residual solids from the solution.

It would, therefore, be desirable to provide a process that recovers almost 100 percent of zinc present in the steel plant dust, while rejecting iron completely as an easy settling hematite residue. The steel plants would like an iron oxide residue with less than 1 percent zinc for recycling to their furnaces. We have found that a two-stage leaching process meets this criterion and is the subject of this patent.

OBJECTS OF THE INVENTION

It is an object of the invention to provide a sulfuric acid leaching process for selectively recovering zinc from steel plant dust.

Another object is to provide a two-stage sulfuric acid leaching process for quantitatively recovering zinc from steel plant dust and completely rejecting iron in the form of a hematite residue which is easily separated from the leach solution and which can be recycled as charge material to steel furnaces.

These and other objects will more clearly appear when taken in conjunction with the following disclosure, the appended claims and the accompanying drawing which depicts a preferred embodiment of the invention.

SUMMARY OF THE INVENTION

The essential elements of the two-stage leaching process for selective recovery of zinc from steel plant dust 10 are shown by the accompanying process flowsheet. The first stage leaching is performed at atmospheric pressure at temperatures below the boiling point. The second stage leaching is performed at high pressures, in an autoclave, at temperatures well in excess of the boiling point. The two stages are connected to each other in a countercurrent fashion with two liquid/solid separation steps in between them.

The fresh steel plant dust 10 is added to the atmospheric leaching step 11, which receives acidic zinc sulfate solution from the pressure leaching step 16 following solid/liquid separation 19 via recycle line 21. Some of the zinc present in the dust reacts with the acid and dissolves. The depletion of acid or the rise in pH causes iron to precipitate from the solution. The atmospheric leach slurry goes to solid/liquid separation step 12, which can be as simple as a thickener because solids do not have to be washed. This step is a crude liquid/solid separation step. The clean supernatant liquor 13 is essentially iron-free zinc sulfate solution which can be treated for recovery of zinc by standard processes such as routinely practiced in electrolytic zinc plants (cementation purification followed by electrowinning). Alternately, a solvent extraction process can be used to purify and concentrate the zinc sulfate solution prior to electrowinning.

The thickened pulp 15 is sent to the pressure leaching step, where concentrated sulfuric acid or a mixture of sulfuric acid-zinc sulfate solution (spent liquor from the electrowinning step) 17 is added to the process. Under the high temperature (i.e., steam 18) and acid concentrations present in the autoclave, zinc present in the feed is quickly and completely dissolved. Most of the iron present in the feed slurry is converted to hematite 20 under the autoclave conditions. In comparison to other forms of iron precipitate such as hydroxide, jarosite, goethite, etc., hematite is more dense and separates more easily from the solution. Due to its high iron and essentially zero sulfur content, hematite is also the preferred form of iron precipitate to be recycled to steel furnaces. This solid/liquid separation may be performed in a continuous countercurrent decantation system or on a filter. The solids can be washed to recover zinc sulfate. The solution goes to the atmospheric leaching step. The washed residue can be recycled to the steel plant either as such or after other chemical and physical treatments. A possible chemical treatment would be to dissolve any lead present in the solids. Caustic or brine leaching can be used to accomplish this, as described in copending patent applications Ser. No. 696,977 filed 1/31/85 or Ser. No. 696,986 filed 1/31/85. A possible physical treatment would be the agglomeration of the hematite solids into pellets, as described in copending patent application Ser. No. 696,981 filed 1/31/85.

DETAILS OF THE INVENTION

The invention is applicable to all types of steel plant dusts. As disclosed in the aforementioned S. L. Law et al. article, these dusts can vary considerably in their composition. For example, they may contain about 20 to 60 percent iron, about 5 to 40 percent zinc and about 0.5 to 6 percent lead. In addition to these two metals of interest, the dusts contain substantial amounts of oxides of other metals such as calcium, manganese, silicon, magnesium, aluminum, etc. The chemical composition of a typical midwest steel plant dust (two samples) used in carrying out the process of this invention is presented in Table 1.

TABLE 1

Chemical Composition Of The Steel Plant Dust Samples Used In The Test Work

| Element | Weight Percent | |
|---|---|---|
| | Sample 1 | Sample 2 |
| Iron | 27.8 | 29.2 |
| Zinc | 25.8 | 25.3 |
| Lead | 3.03 | 3.00 |
| Cadmium | 0.041 | 0.053 |
| Calcium | 6.07 | 6.43 |
| Manganese | 3.12 | 3.78 |
| Silicon | 2.47 | 2.30 |
| Aluminum | 0.57 | 0.475 |
| Copper | 0.16 | 0.203 |
| Chlorine | 3.3 | 0.75 |
| Fluorine | 1.1 | 0.95 |
| Potassium | N.A. | 0.76 |
| Sodium | N.A. | 0.86 |
| Magnesium | N.A. | 1.3 |

Plus small amounts of barium, chromium and nickel.
Balance essentially oxygen.
N.A. - Not analyzed.

The chemistry of the process is based on relative insolubility of iron in mildly acidic sulfate solutions and its precipitation as hematite at elevated temperatures. Zinc, on the other hand, remains soluble as zinc sulfate under these conditions. The overall efficiency of the process depends on actual conditions (temperature, acidity, pulp density, residence time, etc.) used for each of the two leaching stages, as discussed in the following pages.

As illustrative of the invention, the following examples are given:

EXAMPLE 1

A series of four atmospheric leaching tests was performed using steel plant dust and sulfuric acid. The composition of the dust is given in Table 1 (Sample #1). In each test, 200 g of dust was slurried with 800 ml of water (20% pulp density by weight) and heated to 75° C. in a stirred glass reactor. Varying amounts of concentrated $H_2SO_4$ were added to the reactor in each test, as shown in Table 2, which resulted in different final pH. After 2 hours, the slurry was filtered. Most of the solids were saved for the autoclave leach test (Example 2). A small portion was washed, dried and analyzed for zinc, iron and lead. A sample of the filtrate was also analyzed for zinc and iron. The results are included in Table 2.

It is noted that by operating in a pH range of 2 to 3, about 70 percent of the zinc is extracted with very little iron dissolution. Almost complete extraction of zinc can be obtained by providing strong acid concentrations (Test 1) that would dissolve zinc ferrite. This, of course, would result in very high dissolution of iron. Time of leaching need not exceed about 3 or 4 hours and generally is less than about 2 hours.

TABLE 2

Atmospheric Leaching Of Steel Plant Dust (Sample #1) With Sulfuric Acid

|  | Test Number | | | |
|---|---|---|---|---|
|  | 1 | 2 | 3 | 4 |
| $H_2SO_4$ Added, g | 276 | 91 | 87 | 78 |
| Final pH | 0 | 2.0 | 2.5 | 3.0 |
| Residue Analysis, % | | | | |
| Zinc | 1.32 | 9.9 | 10.1 | 11.3 |
| Iron | 21.1 | 37.5 | 38.9 | 38.3 |
| Lead | 8.5 | 4.1 | 4.0 | 4.2 |
| Filtrate, Analysis, g/L | | | | |
| Zinc | 63 | 52 | 50 | 49 |
| Iron | 54 | 0.18 | 0.07 | 0.001 |
| Zinc Extraction, % | 98 | 71 | 70 | 68 |

EXAMPLE 2

A series of four pressure leaching tests was performed using a blend of leach residue from tests described in Example 1 as feed. The lixiviant was a synthetic zinc sulfate-sulfuric acid solution simulating the spent electrolyte from a zinc electrowinning plant. While the zinc concentration of this solution was fixed at 75 g/L Zn, the $H_2SO_4$ concentration was 150 g/L for tests 1 and 2 and 200 g/L for tests 3 and 4. Temperature and oxygen overpressure were the other process variables investigated, as shown by Table 3. In each test, 175 g of wet residue cake (estimated weight of washed, dried residue would be 119 g) was slurried with 500 mls of lixiviant and heated in a stirred glass-lined titanium autoclave to the desired temperature. During heating, the autoclave was bled once at the boiling point to remove nitrogen, etc. Once the final desired temperature was attained, an oxygen overpressure of 50 or 150 psi was applied and maintained for the duration of the test, 1 hour. After quenching, the autoclave was opened and the slurry filtered. The filtrate was saved for the next series of atmospheric leaching tests (Example 3). Only a small sample was analyzed for zinc and iron concentrations. The solids were washed, dried and analyzed for zinc, iron and lead. The results are given in Table 3. Further analysis of the residue samples indicated gypsum and silica to be the primary constituents, besides hematite and lead sulfate. The residue filtered fast.

TABLE 3

Pressure Leaching Of Atmospheric Leach Residues With Simulated Spent Electrolyte

|  | Test Number | | | |
|---|---|---|---|---|
|  | 1 | 2 | 3 | 4 |
| Leaching Conditions | | | | |
| Lixiviant Composition | | | | |
| Zn, g/L | 75 | 75 | 75 | 75 |
| $H_2SO_4$, g/L | 150 | 150 | 200 | 200 |
| Temperature, °C. | 200 | 270 | 270 | 200 |
| Oxygen Overpressure, psi | 150 | 50 | 50 | 150 |
| Residue Analysis | | | | |
| Zinc, % | 2.9 | 0.25 | 0.32 | 1.1 |
| Iron, % | 27.6 | 37.2 | 33.2 | 25.2 |
| Lead, % | 5.0 | 5.2 | 5.0 | 4.5 |
| Filtrate Analysis | | | | |
| Zinc, g/L* | 78 | 85 | 81 | 84 |
| Iron, g/L | 20 | 9 | 12 | 21 |

*Zinc sulfate crystals were observed.

EXAMLPE 3

A series of three atmospheric leaching tests was performed using a new sample of steel plant dust (see Sample #2, table 1, for composition) and a blend of acidic zinc sulfate solutions produced during pressure leaching tests (Example 2). All three tests were performed at 75° C. for 2 hours using 500 ml of the above-mentioned solution. The amount of dust added was, however, varied as shown by Table 4. Other procedures were similar to those described in Example 1. The pulp density by weight for each of Test Nos. 1 to 3 was 26.6%, 23.1% and 16.7%, respectively.

In tests 1 and 2, where an excess of dust was used, not only the zinc extractions were poor but also problems were encountered in the solid/liquid separation step. Iron was precipitated from about 14 g/L in feed to the 1 ppm level in these two tests. However, some zinc sulfate also appeared to precipitate in Test 1.

TABLE 4

Atmospheric Leaching Of Steel Plant Dust (Sample #2) With Acidic Zinc Sulfate Solution

|  | Test Number* | | |
|---|---|---|---|
|  | 1 | 2 | 3 |
| Amount of Dust, g | 200 | 150 | 100 |
| Filtrate | | | |
| pH | 5.0 | 4.8 | 2.7 |
| Iron, g/L | 0.001 | 0.001 | 0.312 |
| Zinc, g/L | 102 | 137 | 110 |
| Residue Analysis | | | |
| Zinc, % | 18.0 | 13.5 | 8.2 |
| Iron, % | 34.0 | 37.9 | 38.2 |
| Zinc Extraction, %** | 25 | 47 | 67 |

*500 ml of solution (81 g/L zinc, 14 g/L iron and pH 0.6) was used in each test.
**Estimated. The unwashed residue was recycled to the pressure leaching step.

EXAMPLE 4

A series of four pressure leaching tests was performed using a blend of atmospheric leach residues from tests described in Example 3. The lixiviant was sulfuric acid solution containing 100 or 150 g/L $H_2SO_4$, as set forth in Table 5. Shorter retention time and lower oxygen overpressure were investigated in these tests performed at 270° C. In each test, 200 g of wet cake was leached with 1 liter of solution, representing a lower pulp density (less than about 16% by weight) than most of those used in the previous test series (Example 2). Other test procedures were similar to those described in Example 2, except that the first wash (2 bed volumes) was combined with the filtrate.

TABLE 5

Pressure Leaching Of Atmospheric Leach Residue With Sulfuric Acid Solution

| | Test Number | | | |
|---|---|---|---|---|
| | 1 | 2 | 3 | 4 |
| Leaching Conditions* | | | | |
| H₂SO₄, g/L | 100 | 100 | 100 | 150 |
| Time, hour | 1 | 0.25 | 0.25 | 0.25 |
| Oxygen Overpressure, psi | 0 | 0 | 25 | 0 |
| Filtrate | | | | |
| pH | 1.44 | 1.46 | 1.33 | 1.06 |
| Zinc, g/L | 20.0 | 21.1 | 21.2 | 21.6 |
| Iron, g/L | 1.11 | 0.64 | 0.22 | 1.73 |
| Residue | | | | |
| Zinc, % | 0.43 | 0.70 | 1.08 | 0.34 |
| Iron, % | 49.9 | 49.2 | 47.8 | 47.8 |

*Each test was run at 270° C., with 200 g moist cake from Example 3 leached with one liter of sulfuric acid.

The results of the tests are discussed as follows:

Atmospheric Leaching Stage

The acid concentration or pH is the most important variable affecting the selective dissolution of zinc from steel plant dusts, as shown by the results presented in Example 1. When the pH of the atmospheric leaching was maintained between 2 and 3, about 70 percent of the zinc dissolved with very little iron dissolution. Basically, zinc, present as simple zinc oxide, dissolved while that present as zinc ferrite did not. By using an excessive amount of acid, it was possible to dissolve zinc almost completely, about 98 percent, but the amount of iron dissolution was extensive. The solution in this case contained about as much iron as zinc. Broadly, the pH may range from about 2 to 3.5 and preferably from about 2.5 to 3.5. The pulp density of the atmospheric leach may range from about 5% to 40% by weight of the mixture over the aforementioned pH range.

Results were similar when the pressure leach liquor (instead of sulfuric acid) was reacted with steel plant dust (Example 3). When an excessive amount of dust was used, the pH of the solution rose to about 5. While these conditions resulted in iron rejection to the 1 ppm level, the zinc extraction was estimated to be under 50 percent. The pulp containing a high percent of solids was not as easy to thicken as when a lower amount of solids and lower pH were used.

In view of the above, the optimum pH for atmospheric leaching appears to be about 3, for example from about 2.5 to about 3.5.

The temperature has only a minor effect on the process. A high temperature, within the range of 25° C. to boiling point, would result in faster kinetics of leaching and also in improved solid/liquid separation. A temperature of about 75° C. yielded excellent results. The temperature preferably ranges from about 30° C. to 90° C.

A residence time of 2 hours was more than adequate for the leaching step in the laboratory tests. This time would have to be adjusted in a continuous commercial operation, depending mainly upon the agitation, pulp density and temperature. The residence time may range up to about 4 hours, e.g., about 1 to 2 or 3 hours.

The concentration of zinc in the atmospheric leach liquor can vary considerably, depending upon the zinc content of the steel plant dust used as feed and, more importantly, the process selected for recovery of zinc from this solution. The examples presented show the effectiveness of the process in a wide range of composition from under 50 g/L zinc to above 100 g/L zinc, for example, 40 to 150 g/L zinc, or 50 g/L to 130 g/L.

Pressure Leaching Stage

The temperature is the main variable for this stage. As the results of the tests shown in Example 2, a higher temperature of 270° C., in comparison to 200° C., resulted in more complete zinc extraction with only about 0.3 percent zinc left in the residue. The higher temperature also resulted in lower iron concentration in solution and produced residues with higher iron contents and better settling properties. In view of these results, a temperature of about 270° C. is preferred and was used in further testing of the process. The temperature may range from over 225° C. to about 300° C. (e.g., 250° C. to 285° C.).

As Examples 2 and 4 show, either plain sulfuric acid or a mixture of zinc sulfate-sulfuric acid (spent electrolyte from a zinc electrowinning plant) can be used as lixiviant. A higher acid concentration resulted in a somewhat lower zinc content in the residue. However, excellent results, less than 1 percent zinc in residue, were obtained at all acid concentrations in the range of 100 to 200 g/L. The actual acid concentration and the pulp density in the autoclave leaching step should be such that the autoclave leach liquor is discharged at a pH of about 1 to 1.5. The zinc concentration of the solution may range from about 20 to 150 g/L, depending mainly upon whether plain sulfuric acid or spent electrolyte is used for leaching and the zinc content of the atmospheric leach residue.

The presence of oxygen applied at overpressure of 25 to 100 psig or 25 to 150 psig decreased the final iron concentration in solution. But since the iron concentration was only about 1 g/L, even without oxygen overpressure (see Example 4), the use of oxygen is not necessary. However, oxygen overpressure may range from about 25 to 250 psig.

The results of the tests set forth in Example 4 also indicate that the pressure leaching can be accomplished in a very short residence time of about 15 minutes. The time may range upwards of one hour.

The residue obtained from the pressure leaching tests contained about 50 percent iron (Table 5) and is excellent feed for steel furnaces. Depending upon the lead content of this residue and its particle size, it may be subjected to a lead leaching step and/or agglomeration step prior to recycling.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A process for selectively recovering zinc from iron-containing steel plant dust which comprises,
   atmospherically leaching said iron-containing steel plant dust in a first stage wherein an amount of said steel plant dust is mixed with an amount of sulfuric acid solution of concentration at least sufficient to leach zinc therefrom and provide a terminal pH ranging from about 2 to 3.5, thereby limiting iron dissolution, subjecting said mixture to a crude liquid/solid separation step whereby a thickened pulp is produced containing zinc and iron values and a separated liquid provided containing zinc which solution is sent to zinc recovery, subjecting said thickened pulp together with additional sulfuric acid-containing solution in a second stage to pressure leach said thickened pulp at an elevated pressure and temperature at least sufficient to leach the remaining zinc value and provide an acid zinc sulfate solution thereof, while converting hydrated iron oxides into free settling hematite residue, the amount of additional sulfuric acid added to said thickened pulp being sufficient to obtain dissolution of the zinc while inhibiting iron dissolution, separating said hematite residue from said acid zinc sulfate solution, and recycling said acid zinc sulfate solution to atmospheric leaching.

2. The process of claim 1, wherein the atmospheric leach is carried out at a temperature ranging from about 25° C. to boiling.

3. The process of claim 1, wherein the high pressure leach is carried out at a temperature of about 225° C. to 300° C. and an oxygen overpressure of about 25 psig to 250 psig.

4. The process of claim 3, wherein the high pressure leach is carried out at a temperature of about 250° C. to 285° C. and an oxygen overpressure of about 25 psig to 150 psig.

5. The process of claim 1, wherein the sulfuric acid concentration in the first stage is sufficient to provide a terminal pH of about 2.5 to 3.5 and in the second stage a terminal pH of about 1 to 1.5.

6. The process of claim 1, wherein the amount of steel plant dust added to the first stage corresponds to a pulp density by weight of about 5% to 40%.

7. The process of claim 1, wherein the steel dust contains about 20% to 60% iron, about 5% to 40% zinc, about 0.5% to 6% lead and the balance oxygen and metal oxides selected from the group consisting of oxides of calcium, manganese, silicon, magnesium and aluminum.

8. A process for selectively recovering zinc from iron-containing steel plant dust which comprises, atmospherically leaching said steel plant dust in a first stage at a temperature of about 25° C. to boiling wherein an amount of said steel plant dust is mixed with an amount of sulfuric acid solution of concentration at least sufficient to leach zinc therefrom and provide a terminal pH ranging from about 2 to 3, thereby limiting iron dissolution, the pulp density ranging by weight from about 5% to 40%, subjecting said mixture to a crude liquid/solid separation step whereby a thickened pulp is produced containing zinc and iron values and a separated liquid provided containing zinc which solution is sent to zinc recovery, subjecting said thickened pulp together with additional sulfuric acid-containing solution in a second stage to high pressure leaching at an oxygen overpressure of about 25 psig to 250 psig and at a temperature of about 225° to 300° C. to leach the remaining zinc values and provide an acid zinc sulfate solution thereof, while converting hydrated iron oxides into free settling hematite residue, the amount of additional sulfuric acid added to said thickened pulp being sufficient to obtain dissolution of the zinc while inhibiting iron dissolution, separating said hematite residue from said acid zinc sulfate solution, and recycling said acid zinc sulfate solution to atmospheric leaching.

9. The process of claim 8, wherein the atmospheric leach is carried out at a temperature of about 25° C. to boiling.

10. The process of claim 8, wherein the temperature and pressure in the second stage leach ranges from about 250° C. to 280° C. and an oxygen overpressure of about 25psig to 150 psig.

* * * * *